United States Patent
Öhlén

(10) Patent No.: US 7,320,095 B2
(45) Date of Patent: Jan. 15, 2008

(54) OPTIMIZATION OF THE DECISION THRESHOLD FOR BINARY SIGNALS

(75) Inventor: Peter Öhlén, Stockholm (SE)

(73) Assignee: Finisar Corporation, Sunnyvale, CA (US)

( * ) Notice: Subject to any disclaimer, the term of this patent is extended or adjusted under 35 U.S.C. 154(b) by 435 days.

(21) Appl. No.: 10/488,448

(22) PCT Filed: Sep. 3, 2002

(86) PCT No.: PCT/SE02/01559
§ 371 (c)(1),
(2), (4) Date: Mar. 3, 2004

(87) PCT Pub. No.: WO03/021857
PCT Pub. Date: Mar. 13, 2003

(65) Prior Publication Data
US 2005/0022077 A1    Jan. 27, 2005

(30) Foreign Application Priority Data
Sep. 3, 2001    (SE) .................................... 0102951

(51) Int. Cl.
*G06F 11/00*    (2006.01)
(52) U.S. Cl. ..................... 714/704; 714/760; 714/799
(58) Field of Classification Search ................ 714/704, 714/752, 799, 760
See application file for complete search history.

(56) References Cited

U.S. PATENT DOCUMENTS 6,877,117 B1 * 4/2005 Childers et al. ............ 714/704
6,885,828 B1 * 4/2005 Cornelius .................. 398/209

FOREIGN PATENT DOCUMENTS

| | | |
|---|---|---|
| EP | 0240157 A2 | 10/1987 |
| EP | 0240157 A3 | 10/1987 |
| EP | 0966117 A1 | 12/1999 |

OTHER PUBLICATIONS

Fang Zhao, George Mathew, B. Farhang-Boroujeny. "*Techniques for Minimizing Error Propagation in Decision Feedback Detectors for Recording Channels*", IEEE Transactions on Magnetics, Jan. 2001, vol. 37, Issue I, Part 2. pp. 592-602.

Narayan B. Mandayam, Behnaam Aazhang. "*Gradient Estimation for Stochastic Optimization of Optical Code-Division Multiple-Access Systems: Part II-Adaptive Detection*", IEEE Journal on Selected Areas in Communications, May 1997, vol. 15, Issue 4. pp. 742-750.

* cited by examiner

*Primary Examiner*—Jacques Louis-Jacques
*Assistant Examiner*—Esaw T. Abraham
(74) *Attorney, Agent, or Firm*—Workman Nydegger

(57) ABSTRACT

A threshold value is set in a decision circuit receiving a transmitted stream of binary symbols from a network link. The decision circuit uses the threshold value for detecting whether a 1 or a 0 is received to produce an output stream having a low bit error rate. Bit errors in the output stream of the detector are detected. The number of errors is counted when a transmitted 0 is detected as a 1 in the output stream. The number of errors is also counted when a transmitted 1 is detected as a 0 in the output stream. The counted numbers of errors are compared to each other. The threshold value is modified, if necessary, based on the result of the comparing, to e.g. make the probabilities of the two kinds of errors equal to each other. Extra predetermined bits can be inserted and used in determining bit errors.

16 Claims, 3 Drawing Sheets

OPTIMIZATION OF THE DECISION THRESHOLD FOR BINARY SIGNALS

FIELD OF THE INVENTION

The present invention relates to a method of setting a decision threshold in a detector circuit receiving a binary signal from a transmission line, to a detector circuit and to a network in which the method is used.

BACKGROUND

In high-speed optical communication systems digital information is usually encoded by intensity modulating an optical signal as illustrated in FIG. 1 and described in the following. There is a continuous stream of bits at a rate B into the system. At the transmitter, a binary "1" digit corresponds to a high optical power, whereas a binary "0" digit corresponds to a relatively low optical power. The signal is then transmitted over an optical fiber and at the receiving end a detector converts the optical input signal to an electrical signal. The electrical signal is then fed to a decision circuit, which samples the signal at specific times and compares the sampled signal to a threshold value. If the sampled value is above or below the threshold the receiver outputs a digital "1" or "0" symbol respectively. Under ideal conditions, the output symbols exactly match the input symbols.

Practically, a signal will for various reasons be degraded when it travels through the different components of a transmission system and then there is a problem of finding or setting an appropriate threshold in binary detection. An appropriate threshold value will give the best possible detection for a given input signal. Many documents deal with this problem of setting an appropriate threshold.

Thus, in U.S. Pat. No. 4,823,260, a binary data regenerator is disclosed which uses three threshold levels, one level located between the other two, the first two levels produced by two control loops such that predetermined error rates occur on the ZERO and on the ONE, conveniently the same error rate for both. The bit error rate (BER) is established separately for the ZERO and the ONE.

In U.S. Pat. No. 5,806,641, a decision threshold setting circuit for e.g. an optical receiver is disclosed in which the average input current is used in order to achieve a variable threshold.

In U.S. Pat. No. 4,456,992, enhancement of the probability of error-free reception of digital data is described, by means of a time-variable threshold value.

In U.S. Pat. No. 5,896,422, a method for adaptively setting of the decision threshold in digital communication is disclosed, in which the average bit amplitude is used.

In U.S. Pat. No. 5,923,219, an automatic threshold control circuit is disclosed, that detects the minimum level of an input signal, and a maximum level relative to the minimum level, and generates a threshold level from these values.

U.S. Pat. No. 4,847,865, an improved circuit for threshold adjustment in digital communication is disclosed.

In U.S. Pat. No. 5,459,311, a fiber optic system including a threshold producing circuit is described, the decision threshold voltage preferably being half the peak voltage.

In U.S. Pat. No. 4,318,128, reception of digital data in the presence of noise is disclosed. A threshold value is set at an average value of a voltage, in which the noise level is taken into account.

In the published European patent application 0 240 157 an optical communication system is described that includes an automatic threshold value controlling circuit for setting the threshold at an average value of the input intensities.

SUMMARY OF THE INVENTION

It is an object of the invention to provide a method of setting, in an optimum and efficient way, a decision threshold in a detection circuit receiving a binary signal, i.e. a signal having two levels, from a transmission line.

Thus, generally in a system or network for communication, in particular high speed optical communication, digital data are transmitted over a transmission link. For an optical link, the digital data are encoded to produce an intensity or power modulated optical signal, with a binary "1" corresponding to high optical and a binary "0" to low optical instantaneous power. The transmitted signal is received and converted by a detector, sampled and fed to a decision circuit for comparing it to a threshold value. Due to noise and degradation data bit errors occur in the decision process, i.e. a 1 can be mistaken for a 0 or a 0 can be mistaken for a 1. By setting the threshold value appropriately the rate of bit errors (BER) in the communication link can be minimized.

The minimization of the BER can be obtained by executing an algorithm for setting the threshold value such that the probability for making an error in a transmitted 1 becomes substantially the same as the probability for making an error in a transmitted 0. This is done by determining the bit error rate for transmitted 1's separately from determining the bit error rate for transmitted 0's. In particular, to determine if there is an error, different methods of coding the transmitted digital data can be used, providing it with inserted predetermined and thus known, extra information.

Thus, a threshold value can be set in a decision circuit connected in a network and receiving from a link in the network a plurality of signal levels representing a transmitted input stream of symbols. Each signal level represents one separate or individual symbol. The decision circuit uses the threshold value for discriminating between two adjacent signal levels comprising a low signal level representing a first symbol and a high signal level representing a second symbol. The decision circuit thereby produces an output stream of symbols substantially agreeing with the input stream. Errors as to the first and second symbols are then determined in the output stream and the number of errors is counted when an input first symbol is detected to give an output second symbol and when an input second symbol is detected to give an output first symbol. The counted numbers of errors are compared to each other. The result of the comparing operation is used for modifying the threshold value if necessary.

BRIEF DESCRIPTION OF THE DRAWINGS

The invention will now be described by way of non-limiting embodiments with reference to the accompanying drawings, in which.

DETAILED DESCRIPTION

Figure 1:
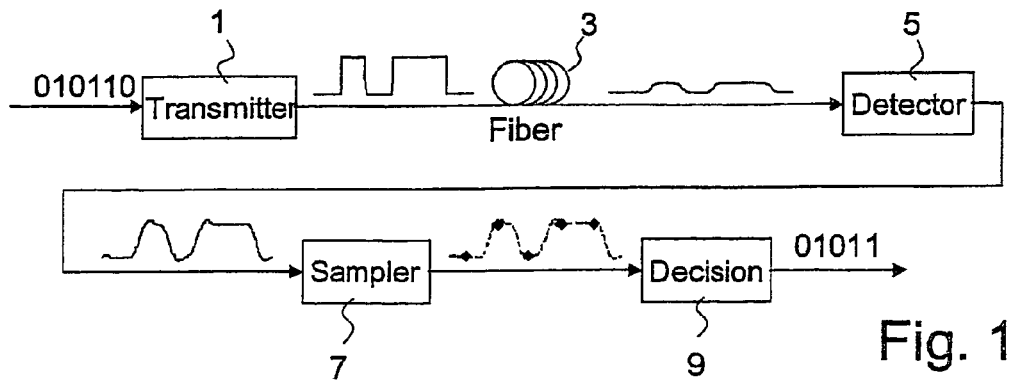
FIG. 1 is a schematic diagram of a simple optical transmission system in which signal shapes due to distortion are illustrated.

In FIG. 1 a high-speed optical communication system is schematically illustrated. An incoming electrical binary, digital signal formed by a continuous stream of bits at a rate B is used to encode an optical signal carrier by modulating the intensity thereof in a transmitter 1. In the output signal of the transmitter, high optical power level corresponds to an input binary "1" whereas a relatively low optical power level corresponds to an input binary "0". The optical signal obtained is then transmitted over an optical fiber length 3 and is at the receiving end of the fiber converted by a detector 5 to an electrical signal. This electrical signal is provided to a sampling circuit 7, which samples the signal at regular occurring times. The sampled values output from the sampling circuit are fed to decision circuit 9 in which the sampled values are compared to a threshold value. If a sampled value is above or below the threshold value the decision circuit outputs a digital "1" or "0" symbol respectively.

Figure 2:
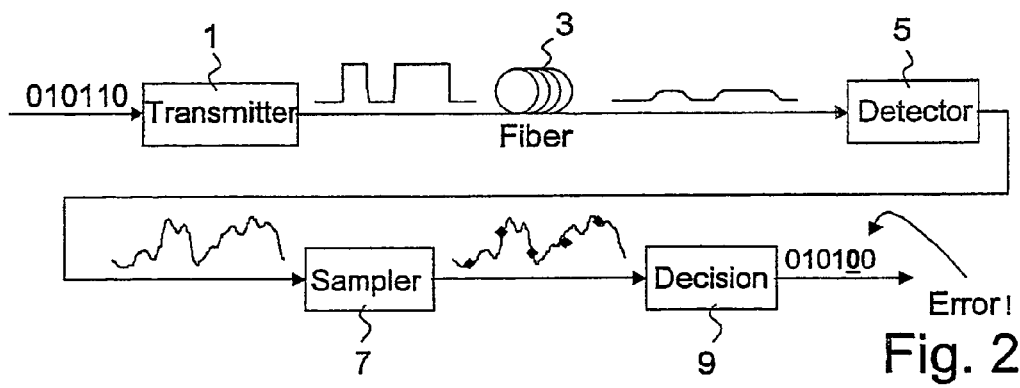
FIG. 2 is a schematic diagram similar to that of FIG. 1 in which signal shapes due to distortion and noise are illustrated.

A signal traveling through the different components of such a transmission system will be degraded due to the physical nature of the components involved. The transmitter 1, the optical fiber 3, and the different parts 5, 7, 9 of the receiver side are not ideal and distort the signal for various reasons. Typical distorted signal shapes are illustrated in the figure at the output side of the detector 5. A main cause of the degradation can be that the bit rate used for the signaling often is close to the maximum speed at which the components used can be operated. Also, various sources of noise exist in a real transmission system. When noise is added to the signal, as illustrated by the signal shapes seen in FIG. 2, the signal amplitude will be random. Therefore the value of the samples that are fed to the decision circuit 9 will also be random and when they are compared to the threshold value a "1" symbol can be mistaken for a "0" symbol, or a "0" symbol can be mistaken for a "1" symbol. This is called a bit error. The most important figure of merit for this kind of communication link is the rate of bit errors, called the bit-error rate (BER) and defined as the proportion of erroneous bits received in relation to the total number of received bits. The BER of typical systems of the kind illustrated in FIGS. 1 and 2 is usually $10^{-12}$ or better.

Figure 3A:
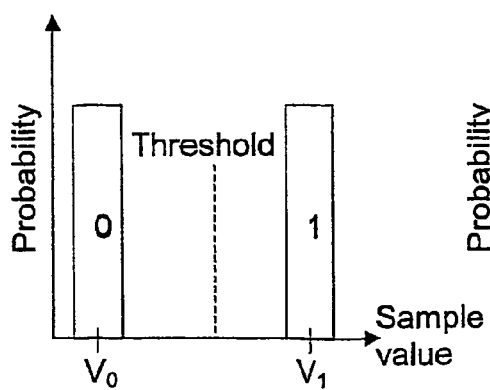
FIGS. 3a and 3b are diagrams of the distribution of sample values obtained in a sampling circuit in the system of FIGS. 1 and 2 as a function of the voltage, the samples being obtained without considering noise and considering noise respectively.
Figure 3B:
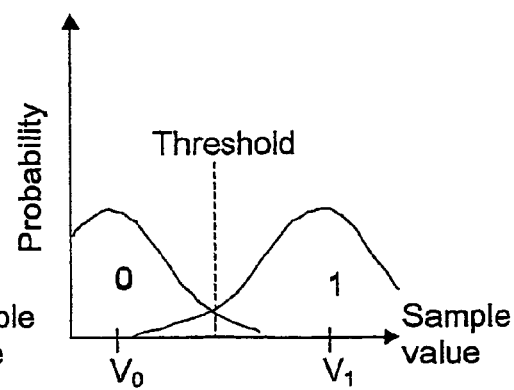

In the diagrams of FIGS. 3a and 3b is illustrated how noise changes the distribution of the sample values that are used to decide whether the input signal corresponds to a "1" or a "0". The diagram of FIG. 3a shows the distribution for a received signal for the case when there is no noise in the transmission. It can be seen that the distribution comprises two narrow peaks, a large interval existing between them within which the threshold value can be selected in order to obtain no errors at all in the decision. Thus, specifically all samples corresponding to 1's are above the threshold and all samples corresponding to 0's are below the threshold.

When noise is added to the signal as illustrated by the distribution plotted in the diagram of FIG. 3b, there is a significant overlap between samples corresponding to 1's and 0's because the two narrow peaks of FIG. 3a are broadened to become two wider peaks. Told in more exact words, the tails of the distributions for transmitted 0's and 1's overlap in the region between the peak values. In this region it is not possible to decide whether a sample value actually corresponds to a "1" or "0", and therefore errors are obtained. Depending on the level at which the threshold value is selected, the probability of making an error will vary, resulting in different BERs.

In many cases, the distributions of the sample values for "1" and "0" are symmetric. In such a case, setting the threshold value to the mean value of the 1 and 0 level, i.e. taking $V_{th}=(V_1-V_0)/2$ where $V_{th}$ is the selected threshold value, $V_0$ and $V_1$ are the voltages at which the peaks of the distribution are obtained, will minimize the BER. In a more general situation, the minimization is not trivial and a minimization problem can be stated as follows provided, as has also been assumed above, that the total numbers of 1's and 0's are equal:

$$\text{minimize } \{P_e[0\text{->}1](V_{th})+P_e[1\text{->}0](V_{th})\} \text{ when varying } V_{th} \quad (1)$$

Here, $P_e[0\text{->}1]$ $(V_{th})$ is the probability that a 0 was sent and was erroneously detected as a 1. This probability will be a function of $V_{th}$. For Gaussian noise, which is commonly used as an approximation of the existing noise, one can easily calculate the optimum value of $V_{th}$ theoretically. Whereas the noise itself can be considered to be Gaussian for all practical purposes, the distortion from which the signal suffers will have to be taken into account in order to calculate the total sample distributions, giving a result that can be far from a Gaussian distribution. There are also other types of degradations, such as crosstalk, which can make the distributions have non-Gaussian shapes. If an algorithm based on the actual shapes of the sample distributions for 1's and 0's were to be implemented in an actual component the shapes of the two distributions have to be measured. This can be difficult in practice.

If the minimization according to (1) is carried out, the probability of making an error for a "1" symbol is in most cases close to the probability of making an error for a "0" symbol. Now, assume that it is by some means possible to find out whether there is an error, and in which direction it goes. Then, the threshold can be optimized by making the probability to make a 0->1 error the same as to make a 1->0 error. Such an algorithm could look like the following:

1. If there is no error, go to 1 and check the next symbol.
2. If there is an error from 0->1, increase the threshold, i.e. set $V_{th}=V_{th}+\Delta V$.
3. If there is an error from 1->0, decrease the threshold, i.e. set Vth=Vth-ΔV.
4. Go to 1 and check the next symbol.

Figure 4:
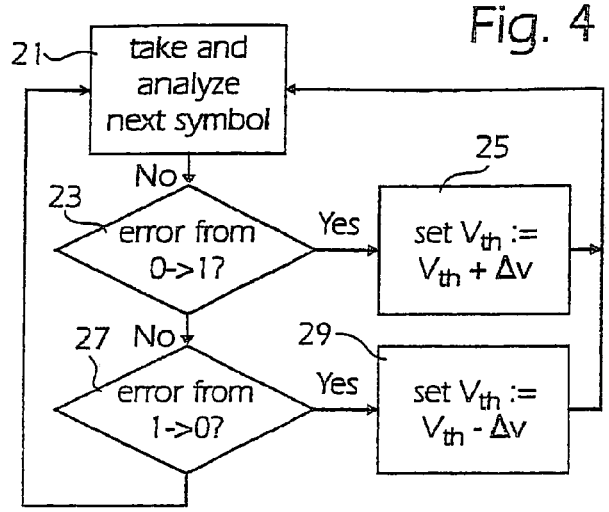
FIG. 4 is a flow chart illustrating steps executed in a receiver to set a threshold value in a decision circuit.

This algorithm is illustrated by the flow chart of FIG. 4. In a first block 21 a new symbol is accessed and analyzed. In the next block 23 is determined whether there is an error of type 0->1. If it is determined that such an error exists in the symbol, a block 25 is executed in which the threshold value is increased by Δ V. Then the block 21 is executed again. If it is determined in block 23 that there is no error type 0->1, a block 27 is executed in which it is determined whether there is an error of type 1->0. If it is determined that such an error exists in the symbol, a block 29 is executed in which the threshold value is decreased by Δ V. Then the block 21 is executed again.

For this simple example algorithm, the increment/decrement Δv should have a sufficiently small value so that once the optimum point is reached, a reasonable number of bit errors in the same direction should not move the threshold value $V_{th}$ substantially away from the optimum point. However, if $\Delta v$ is too small, a very long time will elapse before the optimum is reached. Thus, it is desired to provide a better algorithm that makes the threshold value $V_{th}$ reach its optimum point faster, while still being stable once the optimum is reached. One example of such an algorithm could be to use a larger $\Delta v$ when the receiver is being connected to the transmitter and the link is set up. After some time when the decision threshold has been adjusted $\Delta v$ can be lowered to ensure a more stable operating point. Another way to optimize the threshold could be to find the point where the BER for 0−>1 errors is equal to $1*10^{-9}$, and to find the point where the BER for 1−>0 errors is equal to $1*10^{-9}$ and then take the average of these two points as an estimate of the optimum decision threshold.

A method of determining whether there is an error and in what direction it goes comprises generally that additional information using digital special coding is entered in the information stream. If the additional information is properly selected, it is possible to deduce, by analyzing the extra information that is inserted, whether there is an error and in which direction it goes. A simple example includes using the following two codes:

"111" for "1"
"000" for "0"

To transmit a digital "1" using this code, instead the code word "111" is transmitted. If "110", "101", or "011" is received, it is almost certain that a "111" should have been received because it is much more unlikely that there are two errors than one error. Thus there is a 1−>0 error. To use this coding for each transmitted symbol would decrease the transmitted bit rate too much. Instead these symbols could be only used periodically, i.e. for every n:th bit.

In another type of coding which can also be used, denoted in the art by (64B/66B), two extra bits are inserted every $64^{th}$ bit, in the general case every n:th bit. These two extra bits are either "01" or "10". If "10" is transmitted and instead "11" is received we know that there was a 0−>1 error. The same holds if "01" is transmitted and "11" is received. To summarize, if "11" is received, there is a 0−>1 error and if "00" is received there is a 1−22 0 error. A similar principle can be applied using e.g. the 8B/10B code, see D. G. Cunningham & W. G. Lane, "Gigabit Ethernet Networking", Chapter 8.6, which also has a wide use.

Figure 5:
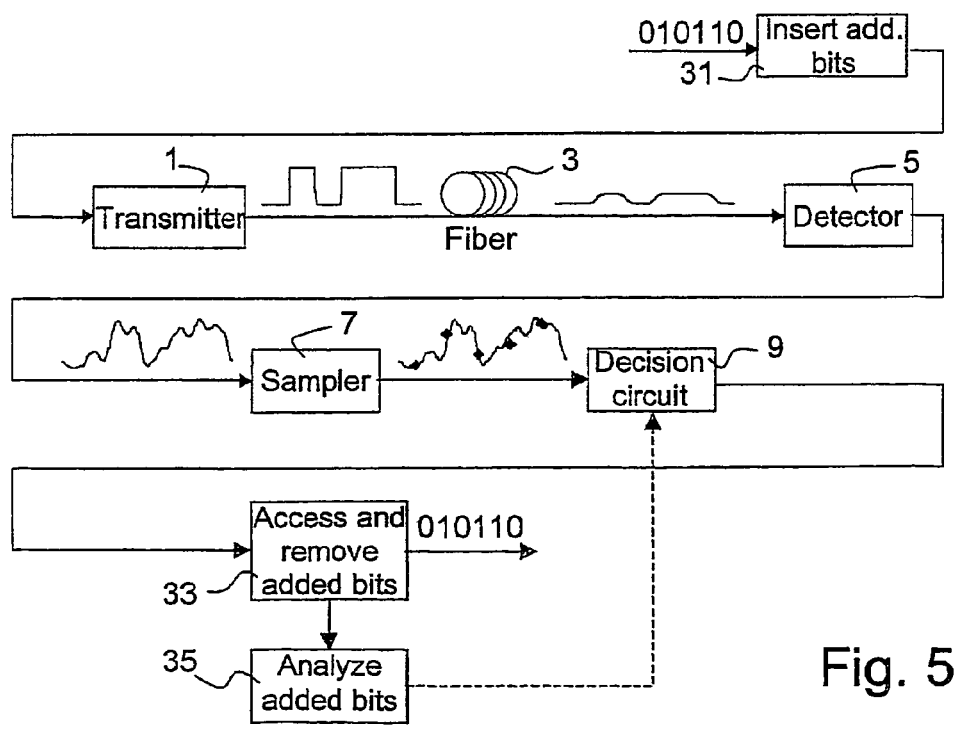
FIG. 5 is a schematic diagram similar to that of FIGS. 1 and 2 in which units have been entered to perform an accurate setting of a threshold value used by a decision circuit.

The basic optical transmission network illustrated in FIGS. 1 and 2 then has to be provided with some more components as seen in the block diagram of FIG. 5. Thus, before reaching the transmitter 1, the incoming bit stream passes through an insertion unit 31 for inserting the extra additional bits. Such a unit will generally comprise some fast buffer as a shift register and control circuits. Similarly, the corresponding output bit stream obtained from the decision circuit 9 passes through another unit 33 for accessing and removing the additional bits. This unit will also include some shift register and control circuits. The accessed additional bits are provided to an analyzing unit 35 that performs the analysis whether the bits indicate an error or not and the probable type of error. The result of the analysis is signaled to the decision circuit 9 which then can increase or decrease the threshold value used for detection whether a 0 or 1 is received.

Figure 6:
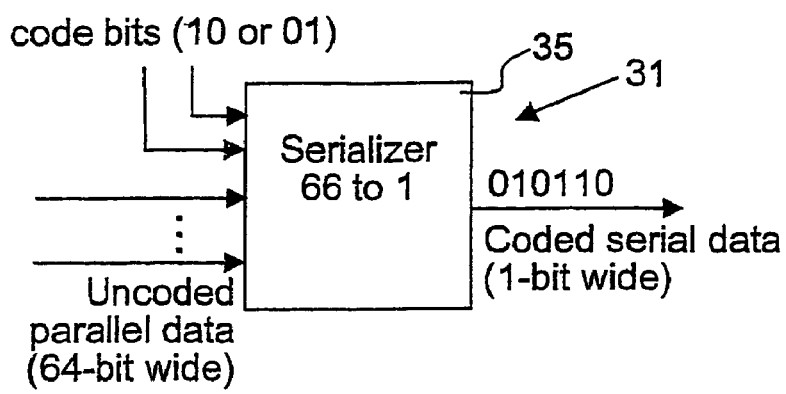
FIG. 6 is a simple diagram of an insertion unit.

The insertion unit 31 can, as seen in FIG. 6, be designed as a serializer or multiplexer 35 for converting bits incoming on a plurality of incoming lines, e.g. 66 lines, to a single output bit stream. The signal data then arrive on some of these input lines, in the example shown on 64 lines, and the extra bits to be inserted on the remaining input lines, in the example on two lines.

Figure 7:
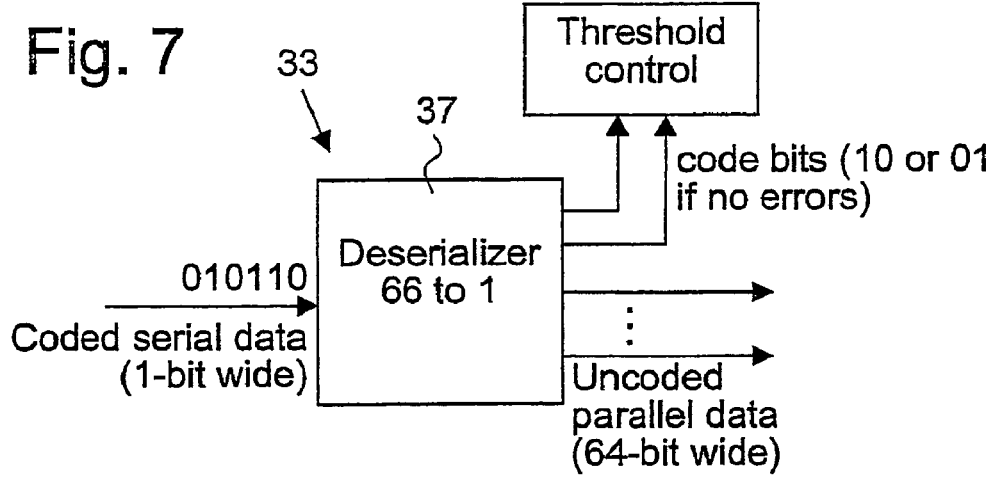
FIG. 7 is a simple diagram of a unit for accessing and removing bits.

In the same way, the accessing and removing unit 33 can, as seen in FIG. 7, comprise a deserializer or demultiplexer 37 for converting the serial bits incoming on single line to data transmitted on a plurality of output lines, e.g. 66 lines in the example. The signal data appear on some of the output lines, in the example shown on 64 lines, and the extra, previously inserted bits on the remaining output lines, in the example on two lines, that are connected to a threshold control unit 39 in the decision circuit 9.

Also other types of codes exist allowing the separate detection of errors of the type 1−>0 and of the type 0−>1. Obviously, all such codes can be used in the method described herein. An example of such codes comprise forward error correction (FEC) codes that are presently often used in optical links having a transmission rate of 10 Gb/s or higher. References to such coding comprise "ITU-T Recommendation G.975" and the book by Simon Haykin, "Digital Communications", chapter 8.

As is obvious to one skilled in the art, the general concept of the method described herein can be practiced in multilevel systems, i.e. in transmission systems using more than two signal levels in transmitting data. Then, more than one threshold value has to be set to optimal values. Each threshold value then discriminates between two adjacent signal levels, allow level and a high level. The threshold value is set in the same way as described above substituting the low signal level for the 0-level and the high signal level for the 1-level.

Also, the method can be used, in addition to fiber optical signaling systems, in all systems having a detector circuit for detecting received binary data from an incoming signal that e.g. can be an electrical signal. Other examples comprise wireless systems such as radio, microwave and IR transmission systems.

Furthermore, as is also obvious to anybody skilled in the art, instead of the direct detection by a level detector 9 as described above using electrical signals, other decision methods can be used. They include but are not limited to all-optical decision circuits, homodyne and heterodyne techniques, and coherent signalling schemes.

The invention claimed is:

1. A method of setting a threshold value in a decision circuit receiving a transmitted stream of binary symbols, the decision circuit using a threshold value for detecting whether a 1 or a 0 is received to produce an output stream having a low bit error rate, said method comprising:
   determining bit errors in the output stream based on extra information inserted before transmitting the stream;
   counting the number of errors when a transmitted 0 is detected to give a 1 in the output stream and the number of errors when a transmitted 1 is detected to give a 0 in the output stream;
   comparing the counted numbers of errors to each other; and
   at least one of maintaining and modifying the threshold value according to the result of the comparing.

2. A method according to claim 1, further comprising:
   setting the threshold value to a first value so that the counted number of errors, when a transmitted 0 is detected to give a 1 in the output stream, is equal to a predetermined error rate, and setting the threshold value to a second value so that the counted number of errors, when a transmitted 1 is detected to give a 0 in the output stream, is equal to the predetermined error rate; and wherein maintaining or modifying the threshold value comprises setting the threshold value to the average of the first and second values.

3. A method according to claim 1, wherein modifying the threshold value comprises decreasing the threshold value if a transmitted 0 is detected to give a 1 in the output stream and increasing the threshold value if a transmitted 1 is detected to give a 0 in the output stream.

4. A method according to claim 3, wherein the decreasing and increasing of the threshold value are made by a predetermined step.

5. A method according to claim 4, wherein the predetermined step provides a first value in an initial stage of setting up the transmitting of the stream of binary symbols, and the predetermined step provides a second value lower than the first value in a later stage of transmitting the stream of binary symbols.

6. A method of setting a threshold value in a decision circuit receiving a transmitted stream of binary symbols, the decision circuit using a threshold value for detecting whether a 1 or a 0 is received to produce an output stream having a low bit error rate, said method comprising:

inserting extra information before transmitting the stream;

accessing the extra information in the output stream and removing it from the output stream;

analyzing the extra information accessed from the output stream to determine whether there is in an error detecting a 1 instead of a 0 or a 0 instead of a 1; and at least one of maintaining and modifying the threshold value according to the analyzing.

7. A method according to claim 6, wherein the extra information is inserted every n:th bit in the stream before transmitting the stream.

8. A method according to claim 6, wherein the extra information is inserted according to a 64B/66B coding method.

9. A method according to claim 6, wherein the extra information is inserted according to a BB/10B coding method.

10. A method according to claim 6, wherein the extra information is inserted according to a forward error correction (FEC) coding method.

11. A method of setting a threshold value in a decision circuit receiving a plurality of signal levels representing a transmitted input stream of symbols, each signal level representing one symbol, the decision circuit using the threshold value for discriminating between two adjacent signal levels, a low signal level representing a first symbol and a high signal level representing a second symbol, to produce an output stream of symbols substantially agreeing with the input stream, said method comprising:

determining errors as to the first and second symbols in the output stream based on extra information inserted before transmitting the stream;

counting the number of errors when an input first symbol is detected to give an output second symbol;

counting the number of errors when an input second symbol is detected to give an output first symbol;

comparing the counted numbers of errors to each other; and at least one of maintaining and modifying the threshold value according to the result of the comparing.

12. A network comprising:

an inserting unit configured to modify an input stream of binary symbols to provide a modified stream of binary symbols;

a transmitter configured to receive the modified stream of binary symbols from the inserting unit and transmit the modified stream;

a transmission link connected to the transmitter, the transmission link being configured to receive the transmitted modified stream of binary symbols from the transmitter and pass the transmitted modified stream to an output end to produce an output stream of binary symbols;

a receiver connected to the output end of the transmission link, to produce an link, the receiver being configured to receive the output stream of binary symbols, the receiver comprising a decision circuit using that uses a threshold value for determining whether a symbol received by the receiver is a 0 or a 1, said decision circuit comprising:

means for determining bit errors in the output stream;

means for counting the number of errors when a transmitted 0 is detected to give a 1 in the output stream;

means for counting the number of errors when a transmitted 1 is detected to give a 0 in the output stream;

means for comparing the counted numbers of errors to each other; and means for maintaining and modifying the threshold value according to the result of the comparing.

13. A network comprising:

an inserting unit configured to modify an input stream of binary symbols to provide a modified stream of binary symbols;

a transmitter configured to receive the modified stream of binary symbols from the inserting unit and transmit the modified stream;

a transmission link connected at an input end of the transmitter for receiving to the transmitter, the transmission link being configured to receive the transmitted modified stream of binary symbols from the transmitter and pass the transmitted modified stream to an output end to produce an output stream of binary symbols;

a receiver connected to the output end of the transmission link, to produce an link, the receiver being configured to receive the output stream of binary symbols, the receiver comprising a decision circuit that uses a threshold value for determining whether a symbol received by the receiver is a 0 or a 1, said decision circuit comprising:

an analyzing and removing unit configured to receive the output stream and provide a modified output stream, by:

analyzing and modifying the output stream;

determining bit errors in the output stream;

counting the number of errors when a transmitted 0 is detected to give a 1 in the output stream;

counting the number of errors when a transmitted 1 is detected to give a 0 in the output stream;

comparing the counted numbers of errors to each other; and providing the result of the analyzing to the decision circuit for maintaining or modifying the threshold value.

14. A network according to claim 13, wherein the inserting unit is arranged to insert extra information in the input stream and the analyzing and removing unit is arranged to remove information from the output stream corresponding to the extra information.

15. A network according to claim 13, wherein the inserting unit is arranged to insert the extra information every n:th bit in the input stream.

16. A receiver configured to receive an input signal representing an input stream of binary symbols and produce an output stream of binary symbols using a threshold value for determining whether the input signal represents a 0 or a 1, wherein said detector circuit comprises receiver comprising:

means for determining bit errors in the input stream based on extra information inserted into the input stream before being received by the receiver;

means for counting the number of errors when a transmitted 0 is detected to give a 1 in the output means for counting the number of errors when a transmitted 1 is detected to give a 0 in the output stream;

means for comparing the counted numbers of errors to each other; and means for maintaining and modifying the threshold valve according to the result of the comparing.

* * * * *

UNITED STATES PATENT AND TRADEMARK OFFICE
CERTIFICATE OF CORRECTION

| | |
|---|---|
| PATENT NO. | : 7,320,095 B2 |
| APPLICATION NO. | : 10/488448 |
| DATED | : January 15, 2008 |
| INVENTOR(S) | : Öhlén |

Page 1 of 1

It is certified that error appears in the above-identified patent and that said Letters Patent is hereby corrected as shown below:

Column 1
Line 57, change "U.S." to --In U.S.--

Column 6
Line 28, change "allow" to --a low--

Column 8
Line 18, after "circuit" delete "using"
Line 46, change "an link" to --a link--

Signed and Sealed this

Sixteenth Day of November, 2010

David J. Kappos
*Director of the United States Patent and Trademark Office*